US012258654B2

(12) United States Patent
Hattendorf et al.

(10) Patent No.: US 12,258,654 B2
(45) Date of Patent: Mar. 25, 2025

(54) NICKEL-CHROMIUM-ALUMINUM ALLOY WITH GOOD PROCESSABILITY, CREEP RESISTANCE, AND CORROSION RESISTANCE, AND USE THEREOF

(71) Applicant: VDM Metals International GmbH, Werdohl (DE)

(72) Inventors: Heike Hattendorf, Werdohl (DE); Benedikt Nowak, Eslohe (DE)

(73) Assignee: VDM Metals International GmbH, Werdohl (DE)

( * ) Notice: Subject to any disclaimer, the term of this patent is extended or adjusted under 35 U.S.C. 154(b) by 411 days.

(21) Appl. No.: 17/779,919

(22) PCT Filed: Dec. 4, 2020

(86) PCT No.: PCT/DE2020/101026
§ 371 (c)(1),
(2) Date: May 25, 2022

(87) PCT Pub. No.: WO2021/110218
PCT Pub. Date: Jun. 10, 2021

(65) Prior Publication Data
US 2023/0020446 A1 Jan. 19, 2023
US 2023/0160040 A2 May 25, 2023

(30) Foreign Application Priority Data

Dec. 6, 2019 (DE) ...................... 10 2019 133 293.1
Dec. 3, 2020 (DE) ...................... 10 2020 132 219.4

(51) Int. Cl.
*C22C 19/05* (2006.01)

(52) U.S. Cl.
CPC .................................. *C22C 19/05* (2013.01)

(58) Field of Classification Search
CPC ........ C22C 19/056; C22C 19/055; C22F 1/10
See application file for complete search history.

(56) References Cited

U.S. PATENT DOCUMENTS

| | | | |
|---|---|---|---|
| 4,784,830 A | 11/1988 | Ganesan et al. | |
| 4,882,125 A | 11/1989 | Smith et al. | |
| 5,862,800 A | 1/1999 | Marko | |
| 5,980,821 A | 11/1999 | Brill | |
| 6,458,318 B1 | 10/2002 | Nishiyama et al. | |
| 6,623,869 B1 | 9/2003 | Nishiyama et al. | |
| 8,977,092 B2 | 3/2015 | Bickham et al. | |
| 9,328,403 B2 | 5/2016 | Semba et al. | |
| 9,476,110 B2 | 10/2016 | Hattendorf et al. | |
| 9,650,698 B2 | 5/2017 | Hattendorf | |
| 9,657,373 B2 | 5/2017 | Hattendorf | |
| 10,196,721 B2 | 2/2019 | Hattendorf et al. | |
| 11,162,160 B2 | 11/2021 | Hattendorf et al. | |
| 11,268,195 B2 | 3/2022 | Nishimoto et al. | |

| | | | |
|---|---|---|---|
| 2013/0323113 A1* | 12/2013 | Hattendorf | C22C 19/05 420/443 |
| 2016/0289807 A1 | 10/2016 | Hattendorf | |
| 2020/0291505 A1 | 9/2020 | Deodeshmukh et al. | |

FOREIGN PATENT DOCUMENTS

| | | |
|---|---|---|
| AU | 2013246982 B2 | 7/2016 |
| CA | 2556128 A1 | 8/2005 |
| CA | 2 785 174 A1 | 7/2011 |
| CN | 103717767 A | 4/2014 |
| CN | 103842537 A | 6/2014 |
| CN | 104245977 A | 12/2014 |
| CN | 104245978 A | 12/2014 |
| CN | 107041147 A | 8/2017 |
| CN | 109312428 A | 2/2019 |
| CN | 111868277 A | 10/2020 |
| DE | 68905640 T2 | 8/1993 |
| DE | 600 04 737 T2 | 6/2004 |
| DE | 10 2012 002 514 A1 | 8/2012 |
| DE | 10 2012 011 161 A1 | 12/2013 |
| DE | 10 2012 011 162 A1 | 12/2013 |
| DE | 10 2012 013 437 B3 | 7/2014 |
| DE | 10 2015 200 881 A1 | 7/2016 |

(Continued)

OTHER PUBLICATIONS

Mehos et al, Concentrating Solar Power Gen3 Demonstration Roadmap, National Renewable Energy Lab (NREL), 2017(140 pages).

Schiek et al, Scale Formation of Alloy 602 CA During Isothermal Oxidation at 800-1100° C. in Different Types of Water Vapor Containing Atmospheres, Oxidation of Metals, 84(5-6), 661-694, 2015 (36 pages).

R. Bürgel, Handbuch Hochtemperatur-Werkstofftechnik, 5. Ueberarbeitete Auflage, 2015, pp. 206-207 and 238 (See Specification for relevance).

(Continued)

*Primary Examiner* — Jessee R Roe
(74) *Attorney, Agent, or Firm* — Collard & Roe, P.C.

(57) ABSTRACT

A nickel-chromium-aluminum alloy includes (in mass %) 12 to 30% chromium, 1.8 to 4.0% aluminum, 0.1 to 7.0% iron, 0.001 to 0.50% silicon, 0.001 to 2.0% manganese, 0.00 to 1.00% titanium, 0.00 to 1.10% niobium, 0.00 to 0.5% copper, 0.00 to 5.00% cobalt, in each case 0.0002 to 0.05% magnesium and/or calcium, 0.001 to 0.12% carbon, 0.001 to 0.050% nitrogen, 0.001 to 0.030% phosphorus, 0.0001 to 0.020% oxygen, max. 0.010% sulfur, max. 2.0% molybdenum, max. 2.0% tungsten, and a remainder of nickel with a minimum content of ≥50% and the usual process-related impurities for use in solar power towers, using chloride and/or carbonate salt melts as a heat transfer medium, wherein in order to ensure a good processability, the following condition must be met: Fv≥0.9 with Fv=4.88050−0.095546*Fe−0.0178784*Cr−0.992452*Al−1.51498*Ti−0.506893*Nb+0.0426004*Al*Fe, where Fe, Cr, Al, Ti, and Nb are the concentration of the respective elements in mass %.

15 Claims, 1 Drawing Sheet

(56) References Cited

FOREIGN PATENT DOCUMENTS

| | | |
|---|---|---|
| DE | 10 2015 008 322 A1 | 1/2017 |
| DE | 10 2016 111 736 A1 | 12/2017 |
| DE | 102018107248 A1 | 10/2019 |
| EP | 0 338 574 A1 | 10/1989 |
| EP | 0 508 058 A1 | 10/1992 |
| EP | 0 549 286 A1 | 6/1993 |
| EP | 1 065 290 A1 | 1/2001 |
| JP | H01-312051 A | 12/1989 |
| JP | H06-264169 A | 9/1994 |
| JP | H07-216483 A | 8/1995 |
| JP | 2001-040443 A | 2/2001 |
| JP | 2003-073763 A | 3/2003 |
| JP | 2013-516531 A | 5/2013 |
| JP | 2014-513200 A | 5/2014 |
| JP | 2015-520250 A | 7/2015 |
| JP | 2015-521300 A | 7/2015 |
| JP | 2015-524023 A | 8/2015 |
| JP | 2015-531821 A | 11/2015 |
| JP | 2020-537112 A | 12/2020 |
| JP | 2021-516727 A | 7/2021 |
| WO | 00/34540 A1 | 6/2000 |
| WO | 2005/078148 A1 | 8/2005 |
| WO | 2019/075177 A1 | 4/2019 |
| WO | 2019/138986 A1 | 7/2019 |
| WO | 2019/185082 A1 | 10/2019 |

OTHER PUBLICATIONS

English translation of the International Preliminary Report on Patentability and Written Opinion of the International Searching Authority in PCT/DE2020/101026, mailed Jun. 16, 2022.
International Search Report in PCT/DE2020/101025, mailed Apr. 9, 2021.
International Search Report in PCT/DE2020/101026, mailed Mar. 10, 2021.
Gomez-Vidal J.C. et al. "Corrosion resistance of alumina-forming alloys against molten chlorides for energy production. I: Pre-oxidation treatment and isothennal corrosion tests" Solar Energy Materials and Solar Cells, Elsevier Science Publishers, Amsterdam, NL. vol. 166, Feb. 24, 2017 (Feb. 24, 2017), pp. 222-233.
Kruizenga et al., Materials Corrosion of High Temperature Alloys Immersed in 600° C. Binary Nitrate Salt, Sandia Report, SAND 2013-2526, 2013.
DIN ENISO 6892-1 (2009) (72 pages).
DIN ENISO 6892-2 (May 2011) (29 pages) (See Specification for relevance).
Ralf Bürgel, Handbuch der Hochtemperaturwerkstofftechnik, 3. Auflage, Vieweg Verlag, Wiesbaden, 2006, Seite 358-369, 370-374 (See Specification for relevance).
Shankar et al., 2013, Corrosion of Nickel-Containing Alloys in Molten LiCl—KCl Medium, Corrosion, 69(1), 48-57.
E. Slevolden, J.Z. Albertsen. U. Fink, "Tjeldbergodden Methanol Plant: Metal Dusting Investigations," Corrosion/2011, paper No. 11144 (Houston, TX: NACE 2011), pp. 1-15.
George Y. Lai, 1990, High-Temperature Corrosion and Materials Applications, ASM International, S. 100, p. 154, Figs. 6.10 & 6.11.
David Young, 2008, High Temp oxidation and corrosion of metals, Elsevier, Chapter 7 Alloy Oxidation III: Multiphase Scales pp. 334-341.
Giggins and Pettit, 1971, Oxidation of Ni—Cr—Al Alloys Between 1000° and 1200° C., J. Electrochem. Soc., 118(11), 1782-1790.
Grabke et al., 1995, the Effects of chlorides, hydrogen chloride, and sulfur dioxide in the oxidation of steels below deposits, Corrosion Science, 37(7), 1023-1043.
Indacochea et al., 2001, High-Temperature Oxidation and Corrosion of Structural Materials in Molten Chlorides, Oxidation of Metals, 55(1), 1-16.
Vignarooban et al., 2014, Corrosion resistance of Hastelloys in molten metal-chloride heat-transfer fluids for concentrating solar power applications, Solar Energy, 103, 62-69.
Kloewer et al., 1999, Chloride-induced oxidation of nickel-base alloys 600H, 625 and 626 Si, Proc. Conf. Eurocorr (10 pages).
Gomez et al., 2016, Corrosion of alloys in a chloride molten salt (NaCl—LiCl) for solar thermal technologies, Solar Energy Materials and Solar Cells, 157, 234-244 (19 pages).
Kruizenga, Corrosion Mechanisms in Chloride and Carbonate Salts, SANDIA report, SAND 2012-7594, 2012.
Ralf Bürgel, Handbuch Hochtemperatur-Werkstofftechnik, 5th revised edition, 2015, pp. 83, 84, 111, 117-119 (See Specification for relevance).
English translation of the International Preliminary Report on Patentability and Written Opinion of the International Searching Authority in PCT/DE2020/101025, issued May 17, 2022.

\* cited by examiner

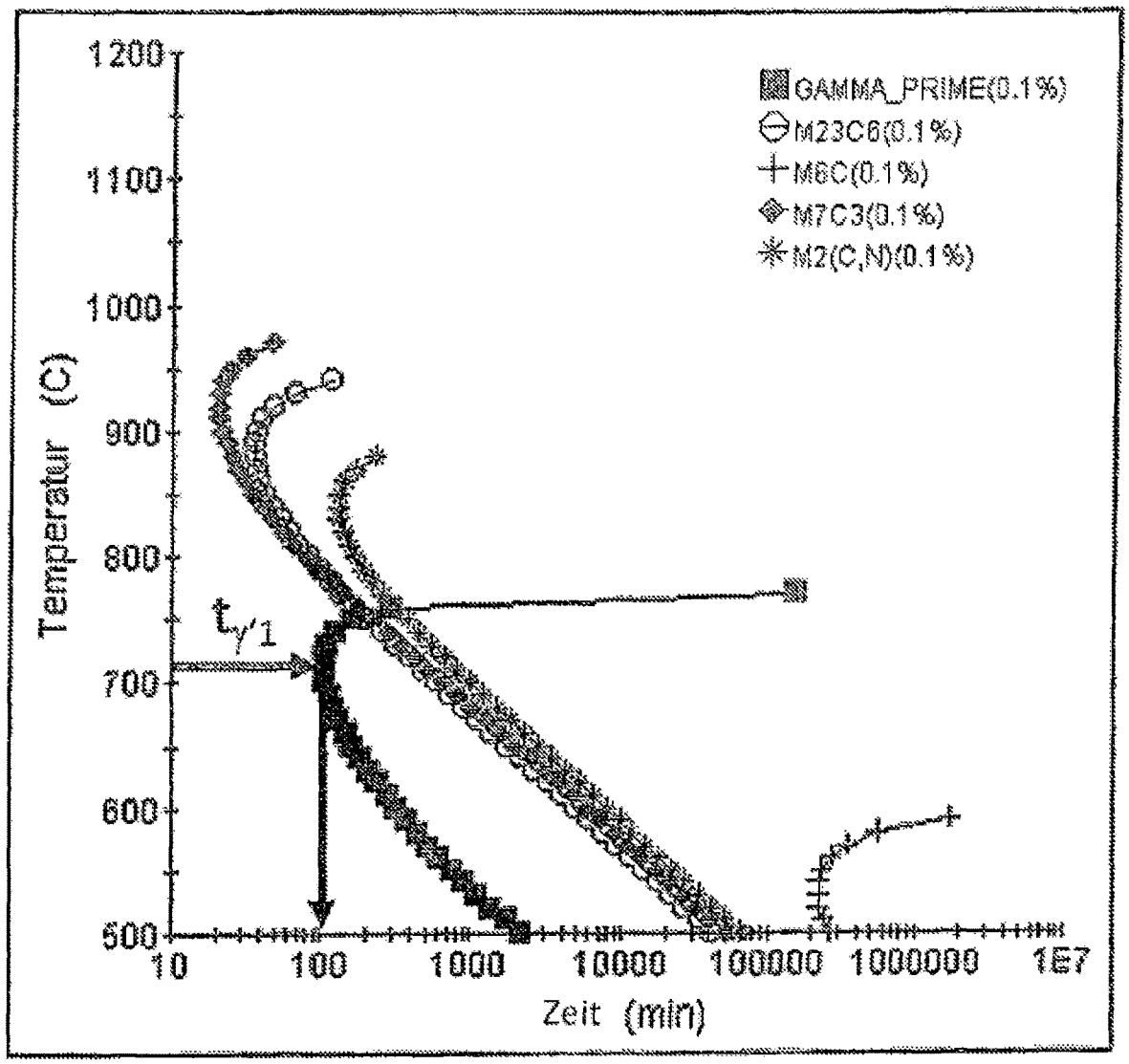
TTT diagram for illustration of the characteristic time $t_{\gamma'1}$.
Temperatur = Temperature; Zeit = Time.

NICKEL-CHROMIUM-ALUMINUM ALLOY WITH GOOD PROCESSABILITY, CREEP RESISTANCE, AND CORROSION RESISTANCE, AND USE THEREOF

CROSS REFERENCE TO RELATED APPLICATIONS

This application is the National Stage of PCT/DE2020/101026 filed on Dec. 4, 2020, which claims priority under 35 U.S.C. § 119 of German Application Nos. 10 2019 133 293.1 filed on Dec. 6, 2019 and 10 2020 132 219.4 filed on Dec. 3, 2020, the disclosures of which are incorporated by reference. The international application under PCT article 21 (2) was not published in English.

BACKGROUND OF THE INVENTION

1. Field of the Invention

The invention relates to a nickel-chromium-aluminum wrought alloy having good high-temperature corrosion resistance, good creep resistance and improved processability.

2. Description of the Related Art

Due to their properties, nickel alloys having different nickel, chromium and aluminum contents have already long been used not only in the chemical and petrochemical industry as well as in furnace construction, but are also of great interest with respect to the use in solar tower power plants. These plants consist of a field of mirrors (heliostats), which are disposed around a high tower. Due to the mirrors, the sunlight is concentrated on the absorber (solar receiver) mounted at the apex. The absorber consists of a tube system, in which a heat-transfer medium is heated. This medium circulates in a loop having temporary storage tanks and, due to a heat-exchanger system, the thermal energy is converted by means of a generator into electricity in a secondary loop. The heat-transfer medium is especially a salt mixture of sodium and potassium nitrate salt melts, whereby a maximum service temperature of the salt of around 600° C. is obtained, depending on the alloy used for the components [Kruizenga et al., 2013, Materials Corrosion of High Temperature Alloys Immersed in 600° C. Binary Nitrate Salt, SANDIA report, SAND 2013-2526].

In order to increase the efficiency of the solar tower power plants, the maximum service temperature of the salts must be raised. This is possible by the use of, for example, chloride and/or carbonate salts as heat-transfer medium [Mehos et al., 2017, Concentrating Solar Power Gen3 Demonstration Roadmap, National Renewable Energy Lab. (NREL)]. These are not decomposed at temperatures above approximately 600° C., such as the sodium and potassium nitrate salts, but instead have a maximum service temperature of up to 1000° C.

The disadvantage of the use of these salt systems is the greater corrosion attack at higher temperatures in comparison with the sodium and potassium nitrate salts, especially in the region of the solar receiver or the heat-absorption tubes, which transport the salt and represent the hottest point in the salt loop. Hereby materials that are commonly used for nitrate salts, such as, for example, Alloy 800H (N08810) or Alloy 625 (N06625), cannot be used, since they would not withstand sufficiently long the corrosion attack by chloride and/or carbonate salts at temperatures >600° C. [Shankar et al., 2013, Corrosion of Ni-containing Alloys in Molten LiCl—KCl Medium, Corrosion, 69 (1), 48-57]. In this context, a minimum useful life of the absorber system of 30 years is assumed [Gomez-Vidal et al., 2017, Corrosion resistance of alumina-forming alloys against molten chlorides for energy production. I: Pre-oxidation treatment and isothermal corrosion tests, Solar Energy Materials and Solar Cells, 166, 222-233].

A substantial prerequisite for use of an alloy in the above-described environment is a good high-temperature corrosion resistance in chloride and/or carbonate salt melts. This is determined not only by a continuous chromium oxide layer ($Cr_2O_3$) but in particular by an underlying aluminum oxide layer ($Al_2O_3$), which is as closed as possible, i.e. continuous and complete. Under specific conditions, the chromium ions are preferentially dissolved in the salt melt. A certain aluminum content in the alloy may slow this process by the formation of a closed $Al_2O_3$ layer [George Y. Lai, 1990, High-Temperature Corrosion of Engineering Alloys, ASM International, p. 100, FIG. 6.11]. On the other hand, the chromium content also should not be too low, since the absorber tubes are exposed on the inside to the salt but on the outside to the ambient air. This means that a certain chromium content is necessary in order to ensure the oxidation resistance to ambient air at the elevated temperatures of up to 1000° C.

The hot strength and creep strength at the indicated temperatures are improved by a high carbon content among other possibilities. However, even high contents of solid-solution-strengthening elements such as chromium, aluminum, silicon, molybdenum and tungsten improve the hot strength. In the range of 500° C. to 900° C., additions of aluminum, titanium and/or niobium may improve the strength, and specifically by precipitation of the $\gamma'$ and/or $\gamma''$ phase.

A further important parameter with respect to the fatigue load of the material due to the daily sunny and cloudy cycles, calculated over the entire useful life of the solar receiver, is the endurance strength under reversed stress.

The compositions of the alloys named Alloy 800H, Alloy 600, Alloy 601, Alloy 690, Alloy 602CA, Alloy 603, Alloy 214, Alloy 625 and Alloy 702 according to the prior art are listed in Table 1.

Alloy 602CA (N06025) and Alloy 603 (N06603) still have an excellent hot strength or creep strength even at temperatures above 1000° C. However, due to the high aluminum contents among other factors, the processability is impaired, wherein the impairment becomes greater with increasing aluminum content (such as, for example, in Alloy 214 (UNS N07214)). In Alloy 602CA (N06025) or Alloy 603 (N06603), the cold formability in particular is reduced by a high content of primary carbides in comparison with alloys such as Alloy 601 (N06601). This means that the aluminum content must be sufficiently high, so that a closed $Al_2O_3$ layer is formed, but it also should not be too high, since otherwise the processability is negatively impacted. This requirement is likewise valid for chromium. Hereby it is clear that an exact matching of the aluminum and chromium content is of decisive importance for the corrosion resistance in chloride and/or carbonate salt melts at elevated temperatures.

WO 2019/075177 A1 discloses an improved solar tower system that has absorber tubes, a storage tank and a heat exchanger, all of which contain a molten salt at temperatures of >650° C. as heat-transfer medium, wherein the improvement requires that at least one of the components (absorber tubes, storage tank and heat exchanger) is made from an alloy that contains (in mass-%) 25-45% Ni, 12-32% Cr, 0.1-2.0% Nb, up to 4% Ta, up to 18 Va, up to 2% Mn, up to 1.0% Al, up to 5% Mo, up to 5% W, up to 0.2% Ti, up to 2% Zr, up to 5% Co, up to 0.1% Y, up to 0.1% La, up to 0.1% Cs, up to 0.1% other rare earths, up to 0.20% C, up to 3% Si, N 0.05-0.50%, up to 0.02% B and the rest Fe and impurities.

EP 549286 discloses a Ni—Cr—Al alloy containing 0.005-0.5% C, 0.0001-0.1% N, 19-25% Cr, 55-65% Ni, 0-1% Mn, 0.1-1.5% Si, 0.15-1% Ti, 1-4.5% Al, 0-0.5% Zr, 0-10% Co, 0.045-0.3% Y, 0.0001-0.1% B and the rest iron and impurities, which is used in the area, among others, of thermal process application, in the chemical and petrochemical industry as well as for components in turbine engines.

WO 00/34540 discloses a high-temperature alloy containing 27-35% Cr, 0-7% Fe, 3-4.4% Al, 0-0.4% Ti, 0.2-3% Nb, 0.12-0.5% C, 0-0.05% Zr, 0.002-0.05% Ce and Y, as well as 0-1% Mn, 0-1% Si, 0-0.5% Ca+Mg, 0-0.1% B and the rest Ni and impurities, which is used in the area, among others, of thermal process application such as the furnace construction, for example as material for the manufacture of furnace muffles and similar component parts for high-temperature applications.

SUMMARY OF THE INVENTION

The task underlying the invention consists in providing a nickel-chromium-aluminum alloy that has
    a good phase stability,
    a good processability,
    and a good corrosion resistance in air, similar to that of Alloy 602CA (N06025)
for another application.

Furthermore, it is necessary that this alloy additionally have
    a good hot strength,
    a good creep strength
    and a good endurance strength under reversed stress This task is accomplished by a nickel-chromium-aluminum alloy containing (in mass-%) 12 to 30% chromium, 1.8 to <4.0% aluminum, 0.1 to 7.0% iron, 0.001 to 0.50% silicon, 0.001 to 2.0% manganese, 0.00 to 1.00% titanium, 0.00 to 1.10% niobium, 0.00 to 0.5% copper, 0.00 to 5.00% cobalt, respectively 0.0002 to 0.05% magnesium and/or calcium, 0.001 to 0.12% carbon, 0.001 to 0.050% nitrogen, 0.001 to 0.030% phosphorus, 0.0001 to 0.020% oxygen, max. 0.010% sulfur, max. 2.0% molybdenum, max. 2.0% tungsten, the rest nickel with a minimum content of ≥50% and the common process-related impurities for the use in solar tower power plants with use of chloride and/or carbonate salt melts as heat-transfer medium, wherein the following condition must be satisfied for assurance of a good processability:

$F_p \geq 0.9$ with $F_p = 4.88050 - 0.095546 \cdot Fe - 0.0178784 \cdot Cr - 0.992452 \cdot Al - 1.51498 \cdot Ti - 0.506893 \cdot Nb + 0.0426004 \cdot Al \cdot Fe$ wherein Fe, Cr, Al, Ti and Nb are the concentrations of the elements in question in mass-%.

Advantageous further developments of the subject matter of the invention can be inferred from the associated dependent claims.

DETAILED DESCRIPTION OF PREFERRED EMBODIMENTS

All values of alloy contents are in mass-% unless otherwise indicated.

The range of values for the element chromium lies between 12 and 30%, wherein preferred ranges may be adjusted as follows:
    14 to 30%
    14 to 28%
    14 to <27%
    16 to 24%
    18 to <24%
    >18 to 23%

The aluminum content lies between 1.8 and 4.0%, wherein here also, depending on service area of the alloy, preferred aluminum contents may be adjusted as follows:
    2.0 to 4.0%
    >2.0 to <4.0%
    2.2 to 4.0%
    2.5 to 4.0%
    2.5 to 3.5%
    2.5 to 3.2%
    2.7 to 3.7%
    >3.0 to 4.0%
    >3.2-<4.0%
    >3.2-3.8%
    >3.0-<3.5%
    2.0 to 3.0%

The iron content lies between 0.1 and 7.08, wherein, depending on the area of application, preferred contents may be adjusted within the following ranges of values:
    0.1-4.0%
    0.1-3.0%
    0.1-<2.5%
    0.1-2.0%
    0.1-<2.0%
    0.1-<1.0%

The silicon content lies between 0.001 and 0.50%. Preferably, Si may be adjusted within the range of values as follows in the alloy:
    0.001-0.40%
    0.001-<0.40%
    0.001-<0.25%
    0.001-0.20%
    0.001-<0.10%
    0.001-<0.05%

The same is true for the element manganese, which may be contained in proportions of 0.001 to 2.0% in the alloy. Alternatively, the following range of values is also conceivable:
    0.001-1.0%
    0.001-0.50%
    0.001-<0.40%
    0.001-<0.30%
    0.001-0.20%
    0.001-0.10%
    0.001-<0.05%

The titanium content lies between 0.00 and 1.08. Preferably, Ti can be adjusted within the range of values as follows in the alloy:
    0.001-0.60%,
    0.001-<0.50%
    0.001-<0.40%
    0.001-<0.20%
    0.001-<0.15%
    0.001-<0.10%
    0.001-<0.05%
    0.00-<0.02%

The Nb content lies between 0.00 and 1.18. Preferably, Nb can be adjusted within the range of values as follows in the alloy:

0.001-0.7%
0.001-<0.50%
0.001-0.30%
0.001-<0.20%
0.00-<0.01%
0.01-0.30%
0.10-1.10%
0.20-0.70%

The alloy contains 0.00 to 0.50% copper. Preferably, this may be adjusted within the range of values as follows in the alloy:
max. 0.20%
max. 0.10%
0.00-0.05%
0.00-<0.05%
0.00-0.015%
0.00-<0.015%

Furthermore, the alloy may contain between 0.0 and 5.00% cobalt. Beyond this, the cobalt content may still be limited as follows:
0.001 to <5.0%
0.001 to 2.0%
0.001 to 1.0%
0.001 to <1.0%
0.001 to 0.50%
0.001 to <0.50%
0.001 to 0.10%
0.001 to <0.10%
0.01 to 2.0%
0.1 to 2.0%

Magnesium and/or calcium is also present in contents of 0.002 to 0.05%. Preferably, the possibility exists of adjusting these elements respectively ss follows in the alloy:
0.0002-0.03%
0.0002-0.02%
0.0005-0.02%

The alloy contains 0.001 to 0.12% carbon. Preferably, this can be adjusted within the range of values as follows in the alloy:
0.001-0.10%
0.001-<0.08%
0.001-<0.05%
0.005-<0.05%
0.01-0.03%
0.01-<0.03%
0.02-0.10%
0.03-0.10%

This is true in the same way for the element nitrogen, which is present in contents between 0.001 and 0.05%. Preferred contents may be present as follows:
0.003-<0.04%

Furthermore, the alloy contains phosphorus in contents between 0.001 and 0.030%. Preferred contents may be present as follows:
0.001-0.020%

Furthermore, the alloy contains oxygen in contents between 0.0001 and 0.020%, especially 0.0001 to 0.010%

The element sulfur is present as follows in the alloy:
max. 0.010%

Molybdenum and tungsten are contained individually or in combination in the alloy with a content of respectively at most 2.0%. Preferred contents may be present as follows:
Mo max. 1.0%
Mo max.<0.50%
Mo max.<0.10%
Mo max.<0.05%
Mo max.<0.01%
W max. 1.0%
W max.<0.50%
W max.<0.10%
W max.<0.05%
W max.<0.01%

The nickel content is greater than or equal to 50%. It may be preferably adjusted as follows:
≥55% or >55%
≥60% or >60%
≥65% or >65%
≥70% or >70%
≥75% or >75%

Optionally the element yttrium may be adjusted to contents of 0.001 to 0.20% in the alloy. Preferably, Y may be adjusted within the range of values as follows in the alloy:
0.001-0.15%
0.001-0.10%
0.001-0.08%
0.001-<0.045%
0.01-0.15%

Optionally the element lanthanum may be adjusted to contents of 0.001 to 0.20% in the alloy. Preferably, lanthanum may be adjusted within the range of values as follows in the alloy:
0.001-0.15%
0.001-0.10%
0.001-0.08%
0.001-0.04%
0.01-0.04%

Optionally the element cerium may be adjusted to contents of 0.001 to 0.20% in the alloy. Preferably, cerium may be adjusted within the range of values as follows in the alloy:
0.001-0.15%
0.001-0.10%
0.001-0.08%
0.001-0.04%
0.01-0.04%

Optionally, in case of simultaneous addition of cerium and lanthanum, cerium mixed metal may also be used in contents of 0.001 to 0.20%. Preferably, cerium mixed metal may be adjusted within the range of values as follows in the alloy:
0.001-0.15%
0.001-0.10%
0.001-0.08%
0.001-0.04%
0.01-0.04%

Optionally the zirconium content lies between 0.001 and 0.20%. Preferably, zirconium may be adjusted within the range of values as follows in the alloy:
0.001-0.15%
0.001-<0.10%
0.001-0.07%
0.001-0.04%
0.01-0.15%
0.01-<0.10%

Optionally the hafnium content lies between 0.001 and 0.20%. Preferably, hafnium may be adjusted within the range of values as follows in the alloy:
0.001-0.15%
0.001-<0.10%
0.001-0.07%
0.001-0.04%
0.01-0.15%
0.01-<0.10%

Optionally, 0.001 to 0.60% tantalum may also be contained in the alloy.

Preferably, tantalum may be adjusted within the range of values as follows in the alloy:
0.001-0.60%
0.001-0.50%
0.001-0.30%
0.001-0.10%
0.00-<0.02%
0.01-0.30%
0.01-0.25%

Optionally, the element boron may be contained as follows in the alloy:
0.0001-0.008%

Preferred contents may be present as follows:
0.0005-0.008%
0.0005-0.004%

Furthermore, at most 0.5% vanadium may be contained in the alloy.

Beyond this, the content of vanadium may be limited as follows:
max. 0.20%
max. 0.10%
max. 0.05%

Finally, as impurities, the elements lead, zinc and tin may also be present in contents as follows:
lead max. 0.002%
zinc max. 0.002%
tin max. 0.002%

The alloy according to the invention is preferably smelted in an open-hearth process, followed by a treatment in a VOD (vacuum oxygen decarburization) or VLF (Vacuum Ladle Furnace) system. However, a smelting and casting in vacuum is also possible. After casting in ingots or as continuous casting, the alloy is annealed in the desired semifinished product mold if necessary at temperatures between 900° C. and 1270° C. for 0.1 hour to 100 hours, then hot-formed, if necessary with intermediate annealings between 900° C. and 1270° C. for 0.05 hours to 100 hours. The surface of the material may if necessary be chemically or mechanically machined for cleaning intermediately (even several times) and/or at the end. After the end of the hot forming, a cold forming to the desired semifinished product shape may be carried out if necessary, with reduction ratios up to 98%, if necessary with intermediate annealings between 700° C. and 1250° C. for 0.1 minutes to 70 hours, if necessary under shield gas, such as, for example, argon or hydrogen, followed by a cooling in air, in the agitated annealing atmosphere or in the water bath Thereafter a solution annealing is carried out in the temperature range from 700° C. to 1250° C. for 0.1 minutes to 70 hours, if necessary under shield gas, such as, for example, argon or hydrogen, followed by a cooling in air, in the agitated annealing atmosphere or in the water bath. If necessary, chemical and/or mechanical cleanings of the material surface may be carried out intermediately and/or after the last annealing.

The alloy according to the invention may be readily manufactured and used in the product forms of strip, sheet, rod, wire, longitudinally welded tube and seamless tube.

The alloy according to the invention is intended preferably to be used in solar tower power plants with use of chloride and/or carbonate salt melts as heat-transfer medium.

It may be used for all components that are in contact with the molten salt.

It may be used in particular for the absorber (solar receiver) in the tower of the solar power plant and/or the heat exchanger for the current-generating loop (for example via a steam turbine) and/or for the storage tank and/or the transport tubes.

The chloride and/or carbonate salt melts may preferably consist of the following mixtures:
$MgCl_2$—KCl
$ZnCl_2$—NaCl—KCl
NaCl—LiCl
KCl—NaCl
KCl—LiCl
LiCl—KCl—CsCl
$Na_2CO_3$—$K_2CO_3$—$Li_2CO_3$
$Li_2CO_3$—$Na_2CO_3$
NaCl—$Na_2CO_3$ The mixture may preferably consist of the following compositions:
60-75% zinc chloride, 2-15% sodium chloride and 15-30% potassium chloride
30-50% magnesium chloride and 50-70% potassium chloride
25-40% sodium carbonate, 25-40% potassium carbonate and 25-40% lithium carbonate If necessary, the salt mixtures may also be used under a pure $CO_2$ atmosphere.

The minimum service temperature of the salt mixture is 250° C. It may be limited as follows:
min. 290° C.
min. 300° C.
min. 350° C.
min. 400° C.
min. 450° C.
min. 500° C.
min. 550° C.
min. 600° C.
>600° C.
min. 650° C.
>650° C.
min. 680° C.
>680° C.
min. 700° C.
min. 750° C.

The maximum service temperature of the salt mixture is 1000° C. It may be limited as follows:
max. 950° C.
max. 900° C.
max. 850° C.
max. 830° C.
<830° C.
max. 800° C.

Evaluation of the Properties
Corrosion Resistance

In an alloy that contains aluminum, it is of decisive importance for the corrosion resistance in chloride-containing and/or carbonate-containing melts at elevated temperatures whether a complete, closed aluminum oxide layer is formed.

For this purpose, minimum contents of the elements for oxide layer formation are necessary, in this case chromium and aluminum [David Young, 2008, High Temp oxidation and corrosion of metals, Elsevier, pp. 334-341]. In this connection, the minimum content of aluminum necessary for formation can be significantly reduced by the addition of chromium, which is also known as "third element effect". Giggins and Pettit have shown that, at 1200° C., a content between 3.5 and 11.0% Al and between 0 and 40% Cr is necessary so that an external $Al_2O_3$ layer is formed and internal oxidation of aluminum does not occur [Giggins and Pettit, 1971, Oxidation of Ni—Cr—Al Alloys Between 1000° and 1200° C., J. Electrochem. Soc., 118 (11), 1782-1790].

Nevertheless, the formation of a closed $Al_2O_3$ layer is possible at lower temperatures under certain atmospheres for alloys having an Al content of <3%, such as, for example, Alloy 602CA [Schiek et al., 2015, Scale Formation of Alloy 602 CA During Isothermal Oxidation at 800-1100° C. in Different Types of Water Vapor Containing Atmospheres, Oxidation of Metals, 84 (5-6), 661-694].

The oxidation resistance among other properties may be further improved by the addition of reactive elements, such as, for example, yttrium or cerium in small proportions.

A gap in the $Al_2O_3$ layer offers a preferential point of attack for the corrosion in environments containing chloride and/or carbonate salts. Chlorine and chloride ions lead to an accelerated corrosion. The mechanism is described in detail by Grabke et al. [Grabke et al., 1995, Effects of chlorides, hydrogen chloride, and sulfur dioxide in the oxidation of steels below deposits, Corrosion Science, 37(7), 1023-1043]. According to [Kruizenga, 2012, Corrosion Mechanisms in Chloride and Carbonate Salts, SANDIA report, SAND 2012-7594], the chromium content should not be too high, since Cr ions preferentially pass as solution into the salt melts under certain conditions. A sufficiently high aluminum content may slow this process by the formation of a closed $Al_2O_3$ layer [George Y. Lai, 1990, High-Temperature Corrosion of Engineering Alloys, ASM International, p. 100, FIG. 6.11].

The chromium content should also not be too low, since the absorber tubes are exposed on the inside to the salt but on the outside to the ambient air. In the course of service in the area of application for establishment of the protective layer, the chromium content is slowly consumed. The useful life of the material is therefore prolonged by a higher chromium content, since a higher content of the element chromium, which forms the protective layer, delays the time at which the chromium content goes below the critical limit and oxides other than $Cr_2O_3$ are formed that may be, for example, iron-containing and/or nickel-containing oxides. These oxides have a much lower oxygen resistance than a protective passive layer of $Cr_2O_3$. Therefore a sufficiently high chromium content is necessary in order to ensure the oxidation resistance to ambient air at the elevated temperatures of up to 1000° C.

In some studies, alloys exhibit, with increasing nickel content, an improved corrosion resistance in chlorine-containing atmospheres, wherein the addition of molybdenum may possibly lead to catastrophic corrosion [Indacochea et al., 2001, High-Temperature Oxidation and Corrosion of Structural Materials in Molten Chlorides, Oxidation of Metals, 55(1), 1-16]. In other studies, it has been possible to prove that a chromium content of <16% leads to extremely high corrosion rates in sodium/potassium/zinc chloride salts at 250° C. and 500° C., since the alloy named Hastelloy N, which contains only 7% chromium, has a much higher corrosion rate than C-276 and C-22, which contain >=16% chromium [Vignarooban et al., 2014, Corrosion resistance of Hastelloys in molten metal-chloride heat-transfer fluids for concentrating solar power applications, Solar Energy, 103, 62-69]. In contrast to the study of Indacochea et al., a molybdenum content of 16% and 13% respectively in the alloys C-276 and C-22 in the study of Vignarooban et al. did not lead to catastrophic corrosion, which may possibly be attributed to the investigated temperature range. In Indacochea et al., this was 725° C. and 650° C. respectively, which was much higher than the 500° C. and 250° C. respectively in Vignarooban et al. The catastrophic corrosion in the study of Indacochea et al. at higher temperatures could therefore be explained by the formation of $MoO_xCl_y$ oxychlorides, the formation of which is extremely temperature-dependent [Klöwer et al., 1999, Chloride-induced oxidation of nickel-base alloys 600H, 625 and 626 Si, Proc. Conf. Eurocorr]. This is likewise true for tungsten, albeit in not such an extreme extent.

In further studies, it has been possible to prove that a reduced iron content in the alloy named Alloy 625 leads, in comparison to Alloy 800H, to a lower corrosion rate in sodium/lithium chloride salts at 650° C. or 700° C. [Gomez et al., 2016, Corrosion of alloys in a chloride molten salt (NaCl—LiCl) for solar thermal technologies, Solar Energy Materials and Solar Cells, 157, 234-244].

Shankar et al. investigated Alloy 600, Alloy 625, Alloy 690 and Alloy 800H and found that an increased nickel content and reduced iron content is advantageous in a lithium/potassium chloride atmosphere at 400, 500 and 600° C. [Shankar et al., 2013, Corrosion of Ni-containing Alloys in Molten LiCl—KCl Medium, Corrosion, 69(1), 48-57]. Beyond this, Alloy 625 exhibited a higher corrosion rate in comparison to Alloy 600 and Alloy 690, which could be explained by the significant molybdenum content (11 mass-% in Alloy 625), since no molybdenum is present in Alloy 600 and Alloy 690.

It was likewise possible to observe these results in relation to an increased nickel content and reduced iron content in the study of Gomez-Vidal et al. [Gomez-Vidal et al., 2017, Corrosion resistance of alumina-forming alloys against molten chlorides for energy production: Pre-oxidation treatment and isothermal corrosion tests, Solar Energy Materials and Solar Cells, 166, 222-233]. Surprisingly, it was also shown that an aluminum content of >2% and <4% in Alloy 702 increases the corrosion resistance due to the formation of an $Al_2O_3$ layer.

In summary, it can be stated that an increased nickel content and reduced chromium content are very advantageous with respect to the corrosion by chloride and/or carbonate salt melts, just as is an increased aluminum content. An addition of iron, molybdenum and tungsten should be avoided.

Processability

For coordination or optimization of the contents of chromium, iron and aluminum and for investigation of which influence results from the addition of further alloying elements such as titanium and niobium, thermodynamic calculations were carried out with the JMatPro simulation program Version 11 of Thermotech. By means of the program, time-temperature-transformation (TTT) diagrams were first calculated for various alloy contents (see FIG. 1). This diagram shows the time after which a certain content (here 0.1%) of a phase is precipitated at a certain temperature. This is calculated for each phase without consideration of the consumption of alloying elements by other phases. In the TTT diagram, each phase has a minimum time until precipitation of that phase. This minimum time $t_{\gamma'1}$ was determined for the γ' phase (GAMMA PRIME in FIG. 1) for various alloy compositions. The γ' phase causes a large increase of strengthening and hardness with simultaneous reduction of the elongation. If it is formed too rapidly in too large proportions, it may lead to cracks during processing (e.g. hot forming, welding). Therefore the minimum time $t_{\gamma'1}$ is taken as parameter in the following for the processability. For the alloy in FIG. 1, it is $t_{\gamma'1}$=107 minutes.

In order to ensure good processability, the time $t_{\gamma'1}$ should be longer than or equal to 8 minutes. This is the case in particular when the following condition is satisfied:

$$F_V \geq 0.9 \text{ with} \tag{1}$$

$$F_V = 4.88050 - 0.095546*Fe - 0.0178784*Cr - 0.992452*Al - 1.51498*Ti - 0.506893*Nb + 0.0426004*Al*Fe \tag{2}$$

wherein Fe, Cr, Al, Ti and Nb are the concentrations of the elements in question in mass-%. Formula (2) is valid only for compositions having a content of Cr<31%, Al<5%, Fe<18%, Ti<1.5% and Nb<4%.

Table 2 shows the composition, the time $t_{\gamma'1}$ and $F_V$ of alloys according to the prior art (T) together with the alloy compositions according to the invention (E) and not according to the invention.

In Table 2a, the time $t_{\gamma'1}$ for the compositions A001 to A018 as well as the alloys according to the prior art was calculated by means of JMatPro (see second-last column) and the value $F_V$ calculated by means of formula (2) (see last column). Table 2b is the continuation of Table 2a relative to the composition of the alloys according to the prior art and of the compositions A001 to A018. Table 2c presents the continuation of Table 2a with the compositions A019 to A032. Table 2d is the continuation of Table 2c relative to the compositions A019 to A032.

The compositions A001 to A004 have an increasing aluminum content, beginning from 2.0 to 4.0%. The other alloy ingredients are constant. The time $t_{\gamma'1}$ becomes shorter with increasing aluminum concentration and the value for $F_V$ likewise becomes smaller. In the composition A004, $F_V=0.53$ and thus condition (1) is not satisfied. Thus this composition is not readily processable. This means that the composition becomes more difficult to process as the aluminum content increases, since the time $t_{\gamma'1}$ characterized by condition (1) and formula (2) is too short.

The compositions A005 to A007 have an increasing chromium content (18, 20 and 23%). The time $t_{\gamma'1}$ and $F_V$ also decrease with increasing chromium contents, but the effect is much smaller than for aluminum.

The compositions A008 to A011 have a decreasing iron content, whereby the time $t_{\gamma'1}$ and the value for $F_V$ become smaller. This means that the addition of iron improves the processability, since the time $t_{\gamma'1}$ becomes longer.

The compositions A012 and A018 have a different titanium content, wherein the compositions A012 to A014 have an increasing titanium content. The increasing titanium concentration causes the time ty and the value for $F_V$ to become smaller, so that the composition A014 with Ti=1.2% is no longer readily processable, since $F_V=0.61$ and thereby condition (1) is no longer satisfied. This is likewise true for the composition A015, which is no longer readily processable due to an increased titanium content (Ti=0.8%) in combination with an aluminum concentration of 2.5%, since $F_V=0.81$. The compositions A016 to A018 have an increasing titanium content with an iron content of 10%. The increasing titanium concentration causes the time $t_{\gamma'1}$ and the value for $F_V$ to become smaller, so that the composition A018 with Ti=1.00% is no longer readily processable, since $F_V=0.82$ and thereby condition (1) is no longer satisfied.

The compositions A019 and A025 in Table 2c have a different niobium content, wherein the compositions A019 to A021 have an increasing niobium content. The increasing niobium concentration causes the time ty and the value for $F_V$ to become smaller, so that the composition A021 with Nb=3.0% is no longer readily processable, since $F_V=0.53$ and thereby condition (1) is no longer satisfied. This is likewise true for the composition A022, which is no longer readily processable due to a niobium content of Nb=1.0% in combination with an aluminum concentration of 3.5%, since $F_V=0.72$. The compositions A023 to A025 have an increasing niobium content with a chromium concentration of 23%. The increasing niobium concentration causes the time $t_{\gamma'1}$ and the value for $F_V$ to become smaller, so that the composition A025 with Nb=3.0% is no longer readily processable, since $F_V=0.85$ and thereby condition (1) is no longer satisfied.

The compositions A026 to A031 have a different content of yttrium, lanthanum, hafnium and tantalum. Since $F_V$ is >0.9 for all compositions, they are readily processable, since the time $t_{\gamma'1}$ is sufficiently long. The composition A032 has a high chromium content of 29.6% with an aluminum content of 2.2% and an $F_V=2.07$ and is therefore readily processable.

In summary, it can be stated that the alloy compositions according to the invention (E) lie within the analysis limits derived above, satisfy the condition (1) and formula (2) with respect to the value for $F_V$ and thus have an adequately long time $t_{\gamma'}1$ and thereby are readily processable. These are the compositions A001 to A003, A005 to A007, A009 to A013, A019 to A020 and A026 to A032.

Among the alloys according to the prior art in Table 2a, the alloys H214 and IN702 have a value for $F_V$ of <0.9. This may be attributed to the increased aluminum content (4.5%) in the case of alloy H214 and to the increased aluminum content (3.25%) in combination with the increased titanium content (0.38%) in the case of IN702. This means that the alloys H214 and IN702 possess a too short time $t_{\gamma'1}$ and thus a poor processability.

The other alloys according to the prior art have a value for $F_V$ of >0.9 and thus are readily processable, since $t_{\gamma'1}$ is sufficiently long. This may be attributed to the lower aluminum content (2.78% for Alloy 603 and even lower for the others) as well as to the limited titanium and niobium contents in combination with aluminum.

For alloy 800 H, it was not possible to calculate a value for $F_V$, since the composition has a relatively high iron content of 46.8% and lies outside the validity range of formula (2) and condition (1).

Further improvements in the processability are achieved in particular when $F_V \geq 1.0$.

Hot Strength, Creep Strength and Endurance Strength Under Reversed Stress

An important point is the adjustment of a suitable grain size in order to achieve a highest possible strength and specifically with respect to both the endurance strength under reversed stress and the creep strength.

A fine-grain hardening (see Hall-Petch relation) brings about, in the lower temperature range, not only an increase in hot strength but also an increase of ductility and toughness. At higher temperatures, however, this proves to be an insufficient procedure for increase of the strength, since a coarse-grained microstructure is of advantage in the creep range (T>0.4 $T_m$, where $T_m$ is the melting point) [R. Bürgel, Handbuch Hochtemperatur-Werkstofftechnik [High-Temperature Materials Engineering], 5th revised edition, 2015, pp. 83/84]. The influence of the grain size on the creep strength or the creep rate may also be described mathematically in the case of grain boundary sliding, wherein the grain boundary diameter varies in inverse proportion to the creep rate. This means that the creep rate during grain boundary sliding becomes smaller as the average grain size becomes larger, thus resulting in a higher creep strength [R. Bürgel, Handbuch Hochtemperatur-Werkstofftechnik [High-Temperature Materials Engineering], 5th revised edition, 2015, pp. 111]. In the case of diffusion creep, i.e. at higher temperatures and lower existing stresses in comparison with grain boundary sliding, the creep rate is inversely proportional to the second or third power of the grain size. In this case, therefore, a coarser microstructure is even more decisive than in the case of grain boundary sliding, which takes place at higher existing stresses than during diffusion creep [R. Bürgel, Handbuch Hochtemperatur-Werkstofftechnik [High-Temperature Materials Engineering], 5th revised edition, 2015, pp. 117/119].

The dependence of the endurance strength under reversed stress or HCF strength (HCF=High Cycle Fatigue) on the grain size is described by Haigh diagrams [R. Bürgel, Handbuch Hochtemperatur-Werkstofftechnik (High-Temperature Materials Engineering], 5th revised edition, 2015, p. 206/207]. At lower temperatures, it is found that a more fine-grained microstructure is of advantage. In general, the fatigue strength increases with decreasing grain size at all temperatures both in HCF (HCF=High Cycle Fatigue) and in the LCF range (LCF=Low Cycle Fatigue) [R. Bürgel, Handbuch Hochtemperatur-Werkstofftechnik [High-Temperature Materials Engineering], 5th revised edition, 2015, p. 238].

The foregoing considerations show that a coarse-grained microstructure is of advantage with respect to the creep strength, but it acts negatively on the fatigue strength.

Therefore the adjustment of a suitable grain size is of decisive importance in order to ensure a practical compromise between creep and fatigue strength.

Therefore the alloys according to the invention typically have a mean grain size of 10 to 500 µm.

In this context, the grain size may lie preferably within the following limits:
10 to 300 µm
10 to 200 µm
10 to 100 µm
10 to 50 µm
50 to 300 µm
60 to 300 µm
70 to 300 µm
75 to 280 µm
80 to 250 µm
20 to 250 µm
20 to 150 µm
20 to 100 µm
30 to 100 µm
40 to 100 µm The claimed limits for the alloy "E" according to the invention can therefore be justified individually as follows:

Too low chromium contents mean that the chromium concentration at the oxide-metal boundary surface during use of the alloy in a corrosive atmosphere decreases very rapidly below the critical limit, so that a closed pure chromium oxide layer can no longer be formed in case of damage of the oxide layer, but instead other less protective oxides (e.g. nickel and/or iron oxides) may also be formed. Therefore 12% is the lower limit for chromium. This is important in particular, since the absorber tubes are exposed on the inside to the salt but on the outside to the ambient air. This means that a certain chromium content is necessary in order to ensure the oxidation resistance to ambient air at the elevated temperatures of up to 1000° C. Too high chromium contents worsen the phase stability of the alloy, especially at the high aluminum contents of ≥1.8%. Therefore 30% chromium is to be regarded as the upper limit.

The formation of an aluminum oxide layer underneath the chromium oxide layer reduces the oxidation rate. Below 1.8% aluminum, the aluminum oxide layer being formed is too incomplete to develop its effect fully. Too high aluminum contents impair the processability of the alloy. Therefore an aluminum content of 4.0% forms the upper limit.

The costs for the alloy increase with the reduction of the iron content. Below 0.1%, the costs rise disproportionally, since special primary material must be used. For cost reasons, therefore, 0.1% iron is the lower limit. With increase of the iron content, the phase stability is reduced (formation of embrittling phases), especially at high chromium and aluminum contents. Therefore 7% Fe is a practical upper limit in order to ensure the phase stability of the alloy according to the invention.

Silicon is needed for the manufacture of the alloy. A minimum content of 0.001% is therefore necessary. Too high contents in turn impair the processability and the phase stability, especially at high aluminum and chromium contents. The silicon content is therefore restricted to 0.50%.

A minimum content of 0.001% manganese is necessary for improvement of the processability. Manganese is limited to 2.0%, since this element reduces the oxidation resistance.

Titanium increases the high-temperature strength. At 1.00% and above, the oxidation behavior may be impaired, which is why 1.00% is the maximum value.

Even very low magnesium and/or calcium contents improve the processing by the binding of sulfur, whereby the occurrence of low-melting nickel-sulfur eutectics is avoided. For magnesium and/or calcium, therefore, a minimum content of 0.0002% is necessary. At too high contents, intermetallic nickel-magnesium phases or nickel-calcium phases may occur, which again greatly worsen the processability. The magnesium and/or calcium content is therefore limited to at most 0.05%.

A minimum content of 0.001% carbon is necessary for a good creep resistance. Carbon is limited to at most 0.12%, since above such a content this element reduces the processability by the excessive formation of primary carbides.

A minimum content of 0.001% nitrogen is necessary, whereby the processability of the material is improved. Nitrogen is limited to at most 0.05%, since this element reduces the processability due to the formation of coarse carbonitrides.

The oxygen content must be ≤0.020%, in order to ensure the manufacturability of the alloy. A too low oxygen content increases the costs. The oxygen content is therefore ≥0.0001%.

The content of phosphorus should be smaller than or equal to 0.030%, since this surface-active element impairs the oxidation resistance. A too low phosphorus content increases the costs. The phosphorus content is therefore ≥0.001%.

The content of sulfur should be adjusted as low as possible, since this surface-active element impairs the oxidation resistance. Therefore at most 0.010% sulfur is specified Molybdenum is limited to at most 2.0%, since this element reduces the oxidation resistance.

Tungsten is limited to at most 2.0%, since this element likewise reduces the oxidation resistance.

If necessary, the oxidation resistance may be further improved with additions of oxygen-affine elements, such as, for example, yttrium, lanthanum, cerium, cerium mixed metal. They do this by being incorporated in the oxide layer, where they block the paths of diffusion of the oxygen to the grain boundaries.

A minimum content of 0.001% yttrium is necessary to obtain the effect of the yttrium that increases the oxidation resistance. For cost reasons, the upper limit is set to 0.20%.

A minimum content of 0.001% lanthanum is necessary to obtain the effect of the lanthanum that increases the oxidation resistance.

For cost reasons, the upper limit is set to 0.20%.

A minimum content of 0.001% cerium is necessary to obtain the effect of the cerium that increases the oxidation resistance. For cost reasons, the upper limit is set to 0.20%.

A minimum content of 0.001% cerium mixed metal is necessary to obtain the effect of the cerium mixed metal that increases the oxidation resistance. For cost reasons, the upper limit is set to 0.20%.

If necessary, niobium may be added, since niobium also increases the high-temperature strength. Higher contents very greatly increase the costs. The upper limit is therefore set at 1.10%.

If necessary, the alloy may also contain tantalum, since tantalum also increases the high-temperature strength. Higher contents very greatly increase the costs. The upper limit is therefore set at 0.60%. A minimum content of 0.001% is necessary in order to achieve an effect.

If necessary, the alloy may also contain zirconium. A minimum content of 0.001% zirconium is necessary to obtain the effect of the zirconium that increases the high-temperature strength and the oxidation resistance. For cost reasons, the upper limit is set to 0.20% zirconium.

If necessary, the alloy may also contain hafnium. A minimum content of 0.001% hafnium is necessary to obtain the effect of the hafnium that increases the high-temperature strength and the oxidation resistance. For cost reasons, the upper limit is set to 0.20% hafnium.

If necessary, boron may be added to the alloy, since boron improves the creep resistance. Therefore a content of at least 0.0001% should be present. At the same time, this surface-active element worsens the oxidation resistance. Therefore at most 0.008% boron is specified.

Cobalt up to 5.0% may be contained in this alloy. Higher contents markedly reduce the oxidation resistance.

Copper is limited to at most 0.5%, since this element reduces the oxidation resistance.

Vanadium is limited to at most 0.5%, since this element likewise reduces the oxidation resistance.

Lead is limited to at most 0.002%, since this element reduces the oxidation resistance. The same is true for zinc and tin.

TABLE 1

Alloys according to ASTM B 168-19[1]/ASTM B167-18[2], ASTM B 163-1[83], ASTM B409-06[4], ASTM B443-18[5] and [6] in no ASTM and ASME standard, [7] from the UNS List, AMS 55508).
All values in mass-%.
Legierung = Alloy

| Legierung | Ni | Cr | Co | Mo | W | Nb | Nb + Ta | Fe | Mn | Al |
|---|---|---|---|---|---|---|---|---|---|---|
| Alloy 800H-N08810[3] [4] | 30.0-35.0 | 19.0-23.0 | | | | | | 39.5 min | 1.8 max | 0.15-0.60 |
| Alloy 600-N08600[1] [2] [3] | 72.0 min | 14.0-17.0 | | | | | | 6.0-10.0 | 1.0 max | |
| Alloy 601-N08601[1] [2] [3] | 56.0-63.0 | 21.0-25.0 | | | | | | Rest | 10 max | 1.0-1.7 |
| Alloy 690-N08690[1] [2] [3] | 58.0 min | 27.0-31.0 | | | | | | 7.0-11.0 | 0.5 max | |
| Alloy 602CA-N08025[1] [2] [3] | Rest | 24.0-26.0 | | | | | | 8.0-11.0 | 0.15 mex | 1.8-2.4 |
| Alloy 603-N08803[1] [2] | Rest | 24.0-26.0 | | | | | | 8.0-11.0 | 0.15 max | 2.4-3.0 |
| Alloy 214-N07214[6] [7] | Rest | 15.0-17.0 | 2.0 max | | 0.50 max | 0.50 max | | 2.0-4.0 | 0.50 max | 4.0-5.0 |
| Alloy 625-N08625[5] | 58.0 min | 20.0-23.0 | 1.0 max | 3.0-10.0 | | | 3.15-4.15 | 5.0 max | 0.50 max | 0.40 max |
| Alloy 702 N07702[5] [8] | Rest | 14.0-17.0 | | | | | | 2.0 max | 1.8 max | 2.75-3.78 |

| Legierung | C | Cu | Si | S | Ti | P | Zr | Y | B | N | La |
|---|---|---|---|---|---|---|---|---|---|---|---|
| Alloy 800H-N08810[3] [4] | 0.06-0.10 | 0.75 max | 1.0 max | 0.015 max | 0.15-0.60 | | | | | | |
| Alloy 600-N08600[1] [2] [3] | 0.15 max | 0.5 max | 0.5 max | 0.015 max | | | | | | | |
| Alloy 601-N08601[1] [2] [3] | 0.10 max | 0.5 max | 0.5 max | 0.015 max | | | | | | | |
| Alloy 690-N08690[1] [2] [3] | 0.05 max | 0.5 max | 1.0 max | 0.015 max | | | | | | | |
| Alloy 602CA-N08025[1] [2] [3] | 0.15-0.25 | 0.1 max | 0.5 max | 0.010 max | 0.1-0.2 | 0.020 max | 0.01-0.10 | 0.05-0.12 | | | |
| Alloy 603-N08803[1] [2] | 0.20-0.40 | 0.50 max | 0.5 max | 0.010 max | 0.01-0.25 | 0.0211 max | 0.01-0.10 | 0.01-0.15 | | | |
| Alloy 214-N07214[6] [7] | 0.05 max | | | 0.015 max | 0.50 max | 0.015 max | max | 0.002-0.05 | 0.006-0.040 max | | |
| Alloy 625-N08625[5] | 0.10 max | | 0.50 max | 0.015 max | 0.40 max | 0.015 max | | | | | |
| Alloy 702 N07702[5] [8] | 0.10 max | 0.5 max | 0.7 max | 0.01 max | 0.25-1.00 | | | | | | |

TABLE 2a

Alloy compositions according to the invention (E) and alloy compositions according to the prior art (T). Element content in mass-%; Chg. = batch number, or, in case of the JMatPro calculations, it corresponds to the composition no.; al batches have Pb 0.002%, Sn < 0.002% and Zn < 0.002%; *) Nominal composition. **) no formation of the Y' phase.

| | Alloy | Chg. | Ni | Cr | Al | Fe | Si | Mn | Ti | Nb | Cu | Co | C | $t_1$ in min | $F_v$ |
|---|---|---|---|---|---|---|---|---|---|---|---|---|---|---|---|
| T | 800 H | 165621 | 30.3 | 20.6 | 0.28 | 46.8 | 0.53 | 0.55 | 0.32 | 0.04 | 0.05 | 0.03 | 0.074 | 332.38 | — |
| T | 600 | 164310 | 73.8 | 15.8 | 0.16 | 9.4 | 0.32 | 0.28 | 0.20 | <0.01 | 0.00 | 0.04 | 0.07 | **) | — |
| T | 601 | 156656 | 59.6 | 23.0 | 1.3 | 14.4 | 0.24 | 0.72 | 0.47 | 0.01 | 0.04 | 0.04 | 0.049 | 40.23 | 1.68 |
| T | 690 | 111389 | 62.0 | 28.5 | 0.3 | 8.45 | 0.32 | 0.12 | 0.29 | 0.01 | 0.01 | 0.01 | 0.022 | 739.00 | 2.92 |
| T | 602 CA | 163985 | 62.1 | 25.4 | 2.3 | 9.17 | 0.07 | 0.07 | 0.13 | <0.01 | 0.01 | 0.05 | 0.168 | 168.12 | 1.97 |
| T | 603 | 52475 | 61.6 | 25.2 | 2.78 | 9.60 | 0.03 | 0.09 | 0.16 | 0.01 | 0.01 | 0.04 | 0.225 | 73.26 | 1.64 |
| T | 214 | *) | 75 | 18 | 4.5 | 3.0 | 0.20 | 0.50 | | | | | | 2.18 | 0.42 |
| T | 625 | 131761 | 60.7 | 21.7 | 0.11 | 4.74 | 0.21 | 0.11 | 0.19 | 3.33 | 0.03 | 0.03 | 0.023 | 552.42 | 1.96 |
| T | 702 | *) | | 15.5 | 3.25 | 1.0 | 0.2 | 0.50 | 0.38 | | 0.01 | 0.10 | 0.02 | 6.48 | 0.85 |
| E | — | A001 | 79.2 | 18 | 2.0 | 0.1 | 0.10 | 0.01 | 0.01 | 0.10 | 0.10 | 0.10 | 0.02 | 387.75 | 2.51 |
| E | — | A002 | 78.2 | 18 | 3.0 | 0.1 | 0.10 | 0.01 | 0.01 | 0.10 | 0.10 | 0.10 | 0.02 | 29.47 | 1.52 |
| E | — | A003 | 77.6 | 18 | 3.4 | 0.1 | 0.10 | 0.01 | 0.01 | 0.10 | 0.10 | 0.10 | 0.02 | 11.72 | 1.12 |
| — | — | A004 | 77.2 | 18 | 4.0 | 0.1 | 0.10 | 0.01 | 0.01 | 0.10 | 0.10 | 0.10 | 0.02 | 3.25 | 0.53 |
| E | — | A005 | 78.7 | 18 | 2.5 | 0.1 | 0.10 | 0.01 | 0.01 | 0.10 | 0.10 | 0.10 | 0.02 | 103.12 | 2.01 |
| E | — | A006 | 76.7 | 20 | 2.5 | 0.1 | 0.10 | 0.01 | 0.01 | 0.10 | 0.10 | 0.10 | 0.02 | 81.04 | 1.98 |
| E | — | A007 | 73.7 | 23 | 2.5 | 0.1 | 0.10 | 0.01 | 0.01 | 0.10 | 0.10 | 0.10 | 0.02 | 65.9 | 1.92 |
| — | — | A008 | 66.3 | 20 | 3.0 | 10.0 | 0.10 | 0.01 | 0.01 | 0.10 | 0.10 | 0.10 | 0.02 | 82.47 | 1.80 |
| E | — | A009 | 72.3 | 20 | 3.0 | 4.0 | 0.10 | 0.01 | 0.01 | 0.10 | 0.10 | 0.10 | 0.02 | 36.87 | 1.61 |
| E | — | A010 | 75.3 | 20 | 3.0 | 1.0 | 0.10 | 0.01 | 0.01 | 0.10 | 0.10 | 0.10 | 0.02 | 26.57 | 1.51 |
| E | — | A011 | 76.2 | 20 | 3.0 | 0.1 | 0.10 | 0.01 | 0.01 | 0.10 | 0.10 | 0.10 | 0.02 | 21.86 | 1.46 |
| E | — | A012 | 72.3 | 21 | 2.0 | 4.0 | 0.10 | 0.01 | 0.01 | 0.10 | 0.10 | 0.10 | 0.02 | 340.34 | 2.41 |
| E | — | A013 | 71.6 | 21 | 2.0 | 4.0 | 0.10 | 0.01 | 0.50 | 0.10 | 0.10 | 0.10 | 0.02 | 24.72 | 1.67 |
| — | — | A014 | 71.1 | 21 | 2.0 | 4.0 | 0.10 | 0.01 | 1.20 | 0.10 | 0.10 | 0.10 | 0.02 | 3.12 | 0.61 |
| — | — | A015 | 71.0 | 21 | 2.5 | 4.0 | 0.10 | 0.01 | 0.80 | 0.10 | 0.10 | 0.10 | 0.02 | 3.82 | 0.81 |
| — | — | A016 | 64.3 | 23 | 2.0 | 10 | 0.10 | 0.01 | 0.01 | 0.10 | 0.10 | 0.10 | 0.02 | 515.51 | 2.32 |
| — | — | A017 | 63.8 | 23 | 2.0 | 10 | 0.10 | 0.01 | 0.50 | 0.10 | 0.10 | 0.10 | 0.02 | 15.89 | 1.57 |
| — | — | A018 | 63.3 | 23 | 2.0 | 10 | 0.10 | 0.01 | 1.00 | 0.10 | 0.10 | 0.10 | 0.02 | 3.12 | 0.82 |

TABLE 2b

Continuation of Table 2a: Alloy compositions according to the invention (E) and alloy compositions according to the prior art (T). Element content in mass-%; Chg. = batch number, or, in case of the JMatPro calculations, it corresponds to the composition no.; all batches have Pb < 0.002%, Sn < 0.002% and Zn < 0.002%; *) Nominal composition. **) not considered in JMatPro calculations.

| | Alloy | Chg. | Mg **) | Ca **) | N | P **) | O | S **) | Mo | W | Y **) | Zr | La **) | B | Hf | Ta | V |
|---|---|---|---|---|---|---|---|---|---|---|---|---|---|---|---|---|---|
| T | 800 H | 165621 | <0.010 | <0.010 | 0.010 | 0.012 | | <0.002 | 0.21 | 0.06 | | <0.01 | | 0.002 | | | 0.03 |
| T | 600 | 164310 | 0.030 | | 0.002 | 0.009 | | 0.002 | 0.01 | 0.01 | | <0.01 | | 0.001 | <0.01 | | 0.03 |
| T | 601 | 156656 | 0.012 | | 0.002 | 0.008 | | 0.002 | 0.04 | 0.01 | | 0.01 | | 0.001 | | | 0.03 |
| T | 690 | 111389 | <0.010 | 0.0005 | 0.024 | 0.005 | | 0.002 | <0.01 | | | | | 0.001 | | | |
| T | 602 CA | 163985 | 0.011 | 0.002 | 0.022 | 0.006 | | 0.002 | 0.01 | | 0.08 | 0.08 | | 0.005 | | | 0.03 |
| T | 603 | 52475 | 0.008 | 0.002 | 0.029 | 0.007 | | 0.002 | 0.01 | | 0.08 | 0.07 | | 0.003 | | | |
| T | 214 | *) | | | | | | | | | | 0.1 | | | | | |
| T | 625 | 131761 | 0.012 | <0.010 | 0.023 | 0.007 | | <0.002 | 8.50 | 0.21 | | <0.01 | | <0.001 | | 0.01 | 0.02 |
| T | 702 | *) | | | | | | 0.002 | | | | | | | | | |
| E | — | A001 | 0.007 | 0.0005 | 0.017 | 0.002 | 0.001 | 0.002 | 0.20 | 0.01 | — | 0.03 | — | 0.003 | 0.0 | 0.0 | 0.01 |
| E | — | A002 | 0.007 | 0.0005 | 0.017 | 0.002 | 0.001 | 0.002 | 0.20 | 0.01 | — | 0.03 | — | 0.003 | 0.0 | 0.0 | 0.01 |
| E | — | A003 | 0.007 | 0.0005 | 0.017 | 0.002 | 0.001 | 0.002 | 0.20 | 0.01 | — | 0.03 | — | 0.003 | 0.0 | 0.0 | 0.01 |
| — | — | A004 | 0.007 | 0.0005 | 0.017 | 0.002 | 0.001 | 0.002 | 0.20 | 0.01 | — | 0.03 | — | 0.003 | 0.0 | 0.0 | 0.01 |
| E | — | A005 | 0.007 | 0.0005 | 0.017 | 0.002 | 0.001 | 0.002 | 0.20 | 0.01 | — | 0.03 | — | 0.003 | 0.0 | 0.0 | 0.01 |
| E | — | A006 | 0.007 | 0.0005 | 0.017 | 0.002 | 0.001 | 0.002 | 0.20 | 0.01 | — | 0.03 | — | 0.003 | 0.0 | 0.0 | 0.01 |
| E | — | A007 | 0.007 | 0.0005 | 0.017 | 0.002 | 0.001 | 0.002 | 0.20 | 0.01 | — | 0.03 | — | 0.003 | 0.0 | 0.0 | 0.01 |
| — | — | A008 | 0.007 | 0.0005 | 0.017 | 0.002 | 0.001 | 0.002 | 0.20 | 0.01 | — | 0.03 | — | 0.003 | 0.0 | 0.0 | 0.01 |
| E | — | A009 | 0.007 | 0.0005 | 0.017 | 0.002 | 0.001 | 0.002 | 0.20 | 0.01 | — | 0.03 | — | 0.003 | 0.0 | 0.0 | 0.01 |
| E | — | A010 | 0.007 | 0.0005 | 0.017 | 0.002 | 0.001 | 0.002 | 0.20 | 0.01 | — | 0.03 | — | 0.003 | 0.0 | 0.0 | 0.01 |
| E | — | A011 | 0.007 | 0.0005 | 0.017 | 0.002 | 0.001 | 0.002 | 0.20 | 0.01 | — | 0.03 | — | 0.003 | 0.0 | 0.0 | 0.01 |
| E | — | A012 | 0.007 | 0.0005 | 0.017 | 0.002 | 0.001 | 0.002 | 0.20 | 0.01 | — | 0.03 | — | 0.003 | 0.0 | 0.0 | 0.01 |
| E | — | A013 | 0.007 | 0.0005 | 0.017 | 0.002 | 0.001 | 0.002 | 0.20 | 0.01 | — | 0.03 | — | 0.003 | 0.0 | 0.0 | 0.01 |
| — | — | A014 | 0.007 | 0.0005 | 0.017 | 0.002 | 0.001 | 0.002 | 0.20 | 0.01 | — | 0.03 | — | 0.003 | 0.0 | 0.0 | 0.01 |
| — | — | A015 | 0.007 | 0.0005 | 0.017 | 0.002 | 0.001 | 0.002 | 0.20 | 0.01 | — | 0.03 | — | 0.003 | 0.0 | 0.0 | 0.01 |
| — | — | A016 | 0.007 | 0.0005 | 0.017 | 0.002 | 0.001 | 0.002 | 0.20 | 0.01 | — | 0.03 | — | 0.003 | 0.0 | 0.0 | 0.01 |
| — | — | A017 | 0.007 | 0.0005 | 0.017 | 0.002 | 0.001 | 0.002 | 0.20 | 0.01 | — | 0.03 | — | 0.003 | 0.0 | 0.0 | 0.01 |
| — | — | A018 | 0.007 | 0.0005 | 0.017 | 0.002 | 0.001 | 0.002 | 0.20 | 0.01 | — | 0.03 | — | 0.003 | 0.0 | 0.0 | 0.01 |

TABLE 2c

Alloy compositions according to the invention (E) and alloy compositions according to the prior art (T). Element content in mass-%; Chg. = batch number, or, in case of the JMatPro calculations, it corresponds to the composition no.; al batches have Pb < 0.002%, Sn < 0.002% and Zn < 0.002%; *) Nominal composition. **) no formation of the Y' phase.

| Alloy | Chg. | Ni | Cr | Al | Fe | Si | Mn | Ti | Nb | Cu | Co | C | $t_1$ in min | $F_v$ |
|---|---|---|---|---|---|---|---|---|---|---|---|---|---|---|
| E | — | A019 | 71.8 | 21 | 2.5 | 4.0 | 0.10 | 0.01 | 0.01 | 0.1 | 0.10 | 0.10 | 0.02 | 29.75 | 2.00 |
| E | — | A020 | 70.9 | 21 | 2.5 | 4.0 | 0.10 | 0.01 | 0.01 | 1.0 | 0.10 | 0.10 | 0.02 | 11.27 | 1.55 |
| — | — | A021 | 68.9 | 21 | 2.5 | 4.0 | 0.10 | 0.01 | 0.01 | 3.0 | 0.10 | 0.10 | 0.02 | 1.81 | 0.53 |
| — | — | A022 | 69.9 | 21 | 3.5 | 4.0 | 0.10 | 0.01 | 0.01 | 1.0 | 0.10 | 0.10 | 0.02 | 1.73 | 0.72 |
| — | — | A023 | 63.9 | 23 | 2.0 | 10.0 | 0.10 | 0.01 | 0.01 | 0.5 | 0.10 | 0.10 | 0.02 | 74.84 | 2.11 |
| — | — | A024 | 63.4 | 23 | 2.0 | 10.0 | 0.10 | 0.01 | 0.01 | 1.0 | 0.10 | 0.10 | 0.02 | 25.52 | 1.86 |
| — | — | A025 | 61.4 | 23 | 2.0 | 10.0 | 0.10 | 0.01 | 0.01 | 3.0 | 0.10 | 0.10 | 0.02 | 4.19 | 0.85 |
| E | — | A026 | 76.2 | 20 | 3.0 | 0.1 | 0.10 | 0.01 | 0.01 | 0.10 | 0.10 | 0.10 | 0.02 | 21.86 | 1.48 |
| E | — | A027 | 76.2 | 20 | 3.0 | 0.1 | 0.10 | 0.01 | 0.01 | 0.10 | 0.10 | 0.10 | 0.02 | 21.86 | 1.48 |
| E | — | A028 | 78.2 | 18 | 3.0 | 0.1 | 0.10 | 0.01 | 0.01 | 0.10 | 0.10 | 0.10 | 0.02 | 29.47 | 1.52 |
| E | — | A029 | 78.2 | 18 | 3.0 | 0.1 | 0.10 | 0.01 | 0.01 | 0.10 | 0.10 | 0.10 | 0.02 | 29.18 | 1.52 |
| E | — | A030 | 75.2 | 21 | 3.0 | 0.1 | 0.10 | 0.01 | 0.01 | 0.10 | 0.10 | 0.10 | 0.02 | 24.49 | 1.46 |
| E | — | A031 | 75.2 | 21 | 3.0 | 0.1 | 0.10 | 0.01 | 0.01 | 0.10 | 0.10 | 0.10 | 0.02 | 24.09 | 1.48 |
| E | — | A032 | 67.8 | 29.8 | 2.2 | 0.1 | 0.05 | 0.01 | 0.01 | 0.14 | 0.01 | 0.001 | 0.020 | 94.08 | 2.07 |

TABLE 2d

Continuation of Table 2c: Alloy compositions according to the invention (E) and alloy compositions according to the prior art (T). Element content in mass-%; Chg. = batch number, or, in case of the JMatPro calculations, it corresponds to the composition no.; al batches have Pb < 0.002%, Sn < 0.002% and Zn < 0.002%; *) Nominal composition. **) not considered in JMatPro calculation.

| Alloy | Chg. | Mg **) | Ca **) | N | P **) | O | S **) | Mo | W | Y **) | Zr | La **) | B | Hf | Ta | V |
|---|---|---|---|---|---|---|---|---|---|---|---|---|---|---|---|---|
| E | — | A019 | 0.007 | 0.0005 | 0.017 | 0.002 | 0.001 | 0.002 | 0.20 | 0.01 | — | 0.03 | — | 0.003 | 0.0 | 0.0 | 0.01 |
| E | — | A020 | 0.007 | 0.0005 | 0.017 | 0.002 | 0.001 | 0.002 | 0.20 | 0.01 | — | 0.03 | — | 0.003 | 0.0 | 0.0 | 0.01 |
| — | — | A021 | 0.007 | 0.0005 | 0.017 | 0.002 | 0.001 | 0.002 | 0.20 | 0.01 | — | 0.03 | — | 0.003 | 0.0 | 0.0 | 0.01 |
| — | — | A022 | 0.007 | 0.0005 | 0.017 | 0.002 | 0.001 | 0.002 | 0.20 | 0.01 | — | 0.03 | — | 0.003 | 0.0 | 0.0 | 0.01 |
| — | — | A023 | 0.007 | 0.0005 | 0.017 | 0.002 | 0.001 | 0.002 | 0.20 | 0.01 | — | 0.03 | — | 0.003 | 0.0 | 0.0 | 0.01 |
| — | — | A024 | 0.007 | 0.0005 | 0.017 | 0.002 | 0.001 | 0.002 | 0.20 | 0.01 | — | 0.03 | — | 0.003 | 0.0 | 0.0 | 0.01 |
| — | — | A025 | 0.007 | 0.0005 | 0.017 | 0.002 | 0.001 | 0.002 | 0.20 | 0.01 | — | 0.03 | — | 0.003 | 0.0 | 0.0 | 0.01 |
| E | — | A026 | 0.007 | 0.0005 | 0.017 | 0.002 | 0.001 | 0.002 | 0.20 | 0.01 | 0.02 | 0.03 | — | 0.003 | 0.0 | 0.0 | 0.01 |
| E | — | A027 | 0.007 | 0.0005 | 0.017 | 0.002 | 0.001 | 0.002 | 0.20 | 0.01 | — | 0.03 | 0.02 | 0.003 | 0.0 | 0.0 | 0.01 |
| E | — | A028 | 0.007 | 0.0005 | 0.017 | 0.002 | 0.001 | 0.002 | 0.20 | 0.01 | — | 0.0 | — | 0.003 | 0.03 | 0.0 | 0.01 |
| E | — | A029 | 0.007 | 0.0005 | 0.017 | 0.002 | 0.001 | 0.002 | 0.20 | 0.01 | — | 0.0 | — | 0.003 | 0.0 | 0.03 | 0.01 |
| E | — | A030 | 0.007 | 0.0005 | 0.017 | 0.002 | 0.001 | 0.002 | 0.20 | 0.01 | — | 0.0 | — | 0.003 | 0.03 | 0.0 | 0.01 |
| E | — | A031 | 0.007 | 0.0005 | 0.017 | 0.002 | 0.001 | 0.002 | 0.20 | 0.01 | — | 0.0 | — | 0.003 | 0.0 | 0.03 | 0.01 |
| E | — | A032 | 0.007 | 0.0005 | 0.017 | 0.002 | 0.001 | 0.002 | 0.01 | 0.01 | — | 0.03 | — | 0.003 | 0.0 | | 0.01 |

The invention claimed is:

1. A nickel-chromium-aluminum alloy containing (in mass-%) 12 to 30% chromium, >3.2 to <4.0% aluminum, 0.1 to 7.0% iron, 0.001 to 0.50% silicon, 0.001 to 2.0% manganese, 0.00 to 1.00% titanium, 0.00 to 1.10% niobium, 0.00 to 0.5% copper, 0.00 to 5.00% cobalt, respectively 0.0002 to 0.05% magnesium and/or calcium, 0.001 to 0.12% carbon, 0.001 to 0.050% nitrogen, 0.001 to 0.030% phosphorus, 0.0001 to 0.020% oxygen, max 0.010% sulfur, max 2.0% molybdenum, max 2.0% tungsten, the rest nickel with a minimum content of ≥50% and the common process-related impurities for the use of strips, sheets, wires, rods, longitudinally welded tubes or seamless tubes at temperatures of 250° C. up to at most 1000° C. in solar tower power plants with use of chloride and/or carbonate salt melts as heat-transfer medium, wherein the chloride and/or carbonate salt melts are 60-75% zinc chloride, 2-15% sodium chloride and 15-30% potassium chloride, or
30-50% magnesium chloride and 50-70% potassium chloride, or
25-40% sodium carbonate, 25-40% potassium carbonate and 25-40% lithium carbonate, wherein the following condition must be satisfied for assurance of a good processability:

$F_f \geq 0.9$ with $F_f = 4.88050 - 0.095546*Fe - 0.0178784*Cr - 0.992452*Al - 1.51498*Ti - 0.506893*Nb + 0.0426004*Al*Fe$ wherein Fe, Cr, Al, Ti and Nb are the concentrations of the elements in question in mass-%.

2. The alloy according to claim 1, with a chromium content of 14 to 30%.

3. The alloy according to claim 1, with an iron content of 0.1 to 4.0%.

4. The alloy according to claim 1, with a silicon content of 0.001 to <0.40%.

5. The alloy according to claim 1, with a manganese content of 0.001 to 1.0%.

6. The alloy according to claim 1, with a titanium content of 0.001 to 0.60%.

7. The alloy according to claim 1, with a niobium content of 0.00 to 0.7%.

8. The alloy according to claim 1, with a carbon content of 0.001 to 0.10%.

9. The alloy according to claim 1, optionally with an yttrium content of 0.001 to 0.20%;
a lanthanum content of 0.001 to 0.20%;

a cerium content of 0.001 to 0.20%;
a cerium mixed metal content of 0.001 to 0.20%;
a zirconium content of 0.001 to 0.20%; and
a hafnium content of 0.001 to 0.20%.

10. The alloy according to claim 1, optionally containing boron with a content of 0.0001 to 0.008%.

11. The alloy according to claim 1, further optionally containing 0.00 to <5.0% cobalt.

12. The alloy according to claim 1, further optionally containing at most 0.5% vanadium.

13. The alloy according to claim 1, wherein the impurities are adjusted in contents of max 0.002% Pb, max 0.002% Zn, max 0.002% Sn.

14. A strip, sheet, wire, rod, longitudinally welded tube or seamless tube comprising the alloy according to claim 1.

15. A method for manufacturing a strip, sheet, wire, rod, longitudinally welded tube or seamless tube comprising:
    providing the alloy according to claim 1; and
    using the alloy to manufacture the strip, sheet, wire, rod, longitudinally welded tube or seamless tube.

* * * * *